United States Patent [19]

Angelo et al.

[11] Patent Number: 4,484,991

[45] Date of Patent: Nov. 27, 1984

[54] CHLORINE GENERATOR AND METHOD OF GENERATING CHLORINE GAS

[75] Inventors: Arthur L. Angelo; Baboobhai S. Patel; Duc T. Bui, All of Houston, Tex.

[73] Assignee: Aqua Pura, Inc., Houston, Tex.

[21] Appl. No.: 463,332

[22] Filed: Feb. 2, 1983

[51] Int. Cl.³ .............................................. C25B 1/10
[52] U.S. Cl. ............................... 204/129; 204/262; 204/263; 204/264; 204/266; 204/128
[58] Field of Search ............... 204/98, 128, 262, 263, 204/264, 266, 129

[56] References Cited

U.S. PATENT DOCUMENTS

| 30,864 | 2/1882 | Justice et al. | 204/128 |
|---|---|---|---|
| 3,705,090 | 12/1972 | Bergeron et al. | 204/128 |
| 4,029,565 | 6/1977 | Bender et al. | 204/266 |
| 4,097,356 | 6/1978 | Yater | 204/266 |
| 4,129,493 | 12/1978 | Tighe et al. | 204/263 |
| 4,136,005 | 1/1979 | Persson et al. | 204/266 |
| 4,260,468 | 4/1981 | Bradley | 204/266 |
| 4,290,873 | 9/1981 | Weaver | 204/128 |
| 4,308,123 | 12/1981 | Lynn | 204/266 |

Primary Examiner—R. L. Andrews
Assistant Examiner—Terryence Chapman
Attorney, Agent, or Firm—Ben D. Tobor

[57] ABSTRACT

A chlorine generator and method of generating chlorine gas includes anode and cathode compartments releasably secured to one another and separated in part by an ion-permeable membrane, and exterior chambers and fluid passageways cooperating therewith to provide circulating fluids to cool and dissipate the heat generated by the anode and cathode.

15 Claims, 3 Drawing Figures

CHLORINE GENERATOR AND METHOD OF GENERATING CHLORINE GAS

FIELD OF THE INVENTION

The invention relates to a chlorine generator and method of generating chlorine gas, whereby the chlorine gas is supplied to a body of water, such as a swimming pool.

DESCRIPTION OF THE PRIOR ART

In U.S. Pat. Nos. 4,097,356, 4,229,272, and 4,250,126, all issued to Yates, and U.S. Pat. Nos. 4,256,552, and 4,334,968, all issued to Sweeney, there are disclosed various embodiments of chlorine generators for supplying chlorinated water to a body of water, such as a swimming pool. Those chlorine generators all generally comprise a housing having an anode compartment adapted for receiving sodium chloride and water, and a cathode compartment adapted for receiving water. Those compartments are separated by a fluorinated polymeric ion-permeable membrane, whereby upon supplying direct current to the anode and cathode, chlorine gas is produced in the anode compartment, and hydrogen gas is produced in the cathode compartment. The ion-permeable membrane permits the transfer of Na+ ions across the membrane from the anode compartment to the cathode compartment In the foregoing patents, issued to Yates, the chlorine and hydrogen gas produced is then piped to either separate hydrogen and chlorine aspirators disposed outside the outer housing, or to a common hydrogen and chlorine aspirator. In the foregoing patents issued to Sweeney, the chlorine gas passes through a venturi mixer which intermixes the chlorine with the water of the body of water, such as a swimming pool.

In the chlorine generators of the foregoing patents, the anode and cathode compartments are designed to be a sealed system, such that the anode and cathode compartments are filled with their respective water and sodium chloride or water, and then are periodically refilled with the water and sodium chloride solution and/or water as required. Either appropriate sensors or visual checking is required to insure that there is an adequate supply of water and sodium chloride and/or water in the respective compartments. Due to the heat generated by the direct electric current passing through the anode and cathode, the anode and cathode compartments should be made to have a sufficiently large volume of space, whereby that heat may be dissipated by the water contained within the respective compartments. Thus, difficulties are presented in attempting to utilize the chlorine generators of the foregoing patents in situations where it is desirable to have a compact unit because of the problems associated with heat build-up. When the volume of space in the anode and cathode compartments is decreased, but the power supply to the anode and cathode is maintained at the necessary level to generate the desired quantity of chlorine gas, the heat generated by the anode and cathode may not be properly dissipated in the smaller anode and cathode compartments. When a sufficiently large volume of space is provided in the anode and cathode compartments, but large quantities of chlorine gas are desired to be generated, it is believed that there are still heat dissipation problems. The additional heat generated in the anode and cathode compartments from the additional direct electric current supplied to the anode and cathode may cause heat dissipation problems in that there is no cooling provided for the anode and cathode compartments.

Further problems associated with the chlorine generators of the foregoing patents relate to the serviceability and replaceability of the ion-permeable membrane. If a failure or leak develops in the ion-permeable membrane, it is extremely difficult to replace the ion-permeable membrane which is fixedly secured between the anode and cathode compartments. In order for the chlorine generators of the foregoing patents to properly function, it is imperative that the two compartments be sealed with respect to one another other than at the interface between the two compartments where the ion-permeable membrane is exposed. For example, in U.S. Pat. No. 4,097,356, the partition separating the two compartments is welded in place. Thus, it is extremely difficult to repair and/or replace the ion-permeable membrane. Furthermore, it is necessary to prevent the intermixing of the water and water and sodium chloride solution in their respective compartments. In all the foregoing chlorine generators, should a leak develop in the partition, the solution from one compartment has no other place to flow other than into the other compartment.

Accordingly, prior to the development of the present invention, there has been no chlorine generator, nor method for generating chlorine gas to be supplied to a body of water, such as a swimming pool, which provides for adequate heat dissipation from the anode and cathode compartments, is readily serviced and repaired, is easily and economically manufactured, assembled and installed, and prevents the intermixing of the solutions contained in the respective anode and cathode compartments. Therefore, the art has sought a chlorine generator and method for generating chlorine gas to be supplied to a body of water, such as a swimming pool, which: provides sufficient cooling for the anode and cathode; is easily and economically manufactured, assembled, and installed; is readily serviced and repaired; and prevents transmission of the respective solutions of the anode and cathode compartments from entering the other compartment.

SUMMARY OF THE INVENTION

In accordance with the invention, the foregoing advantages have been achieved through the present chlorine generator and method for generating chlorine gas. The present invention includes: a first chamber having upper and lower ends and adapted to be filled with water; a second chamber having upper and lower ends and adapted to be filled with water and sodium chloride; a housing, including first and second compartments releasably secured thereto and separated in part by a fluorinated polymeric ion-permeable membrane, the first compartment having upper and lower ends and containing a cathode and the second compartment having upper and lower ends and containing an anode; a first fluid communication means disposed between the first chamber and the first compartment for supplying cooling water to the cathode in the first compartment; a second fluid communication means disposed between the second chamber and the second compartment for applying cooling water and sodium chloride to the anode in the second compartment; and means for removing chlorine gas from the second compartment; whereby, upon electrical power being supplied to the anode and cathode, chlorine gas is generated in the second compartment.

A feature of the present invention is that the second fluid communication means comprises at least two pipes, the first pipe extending from the upper end of the second chamber to the upper end of the second compartment and the second pipe extends from the lower end of the second chamber to the lower end of the second compartment. A further feature of the present invention is that each compartment of the housing is formed with at least one opening therein and each compartment has a means for releasably connecting the compartments to one another with each of said at least one openings in a substantially mating relationship with each other and with the ion-permeable membrane separating in part the two compartments. The means for releasably connecting may comprise a flange portion on each compartment and a plurality of bolts passing through the flange portions. Another feature of the present invention is that the at least two pipes may be flexibly mounted with respect to the second chamber and the second compartment. Further, the two pipes may be flexibly mounted with respect to the first chamber and the first compartment.

Another feature of the present invention is that the means for removing chlorine gas from the second compartment may comprise a tube associated with the first pipes, whereby the chlorine gas bubbles through the water and sodium chloride in the first pipe and passes outwardly through the tube. The second chamber may contain a means for filtering the water from the sodium chloride to substantially prevent sodium chloride crystals from entering the second compartment. The means for filtering may comprise a substantially upright perforated tube disposed in the second chamber and the at least two pipes may be in a fluid communicating relationship with the perforated tube.

The foregoing advantages have also been achieved through the present method of generating chlorine gas. The present invention includes the steps of: mounting a cathode in a first compartment having upper and lower ends; mounting an anode in a second compartment having upper and lower ends; releasably securing the first and second compartments together and disposing a fluorinated polymeric ion-permeable membrane between the first and second compartments; disposing a first chamber having upper and lower ends and containing water in a fluid transmitting relationship with the first compartment; disposing a second chamber having upper and lower ends and containing water and sodium chloride in a fluid transmitting relationship with the second compartment; supplying electrical power to the anode and cathode to generate chlorine gas in the second compartment, and to heat the water and sodium chloride in the second compartment; circulating the heated water in the second compartment from the upper end of the second compartment to the upper end of the second chamber; circulating water and sodium chloride from the lower end of the second chamber into the lower end of the second compartment; and removing the chlorine gas from the second compartment.

The method of the present invention may further include the step of generating and removing hydrogen gas from the first compartment; circulating the water in the first compartment from the upper end of the first compartment to the upper end of the first chamber; and circulating water from the lower end of the first chamber into the lower end of the first compartment.

A further feature of the present invention is that the water and sodium chloride may be filtered in the second chamber to substantially prevent sodium chloride crystals from entering the second compartment. A further feature of the present invention is that a substantially upright perforated tube may be utilized in the second chamber and sodium chloride is placed around the perforated upright tube.

An additional feature of the present invention is that the first and second compartments may be releasably secured by: providing each compartment with at least one opening therein; providing each compartment with a flange portion; disposing each of the at least one openings in a mating relationship; disposing the ion-permeable membrane between the at least one openings of the first and second compartments; and bolting the flanged portions together.

The chlorine generator and method for generating chlorine gas of the present invention, when compared with previously proposed prior art chlorine generators and methods have the advantages of: being easily and economically manufactured, assembled and installed; providing adequate cooling to the anode and cathode contained within their respective compartments; providing for easy and economical servicing and repairing of the chlorine generator; and preventing the solution contained in one compartment from leaking into another compartment.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
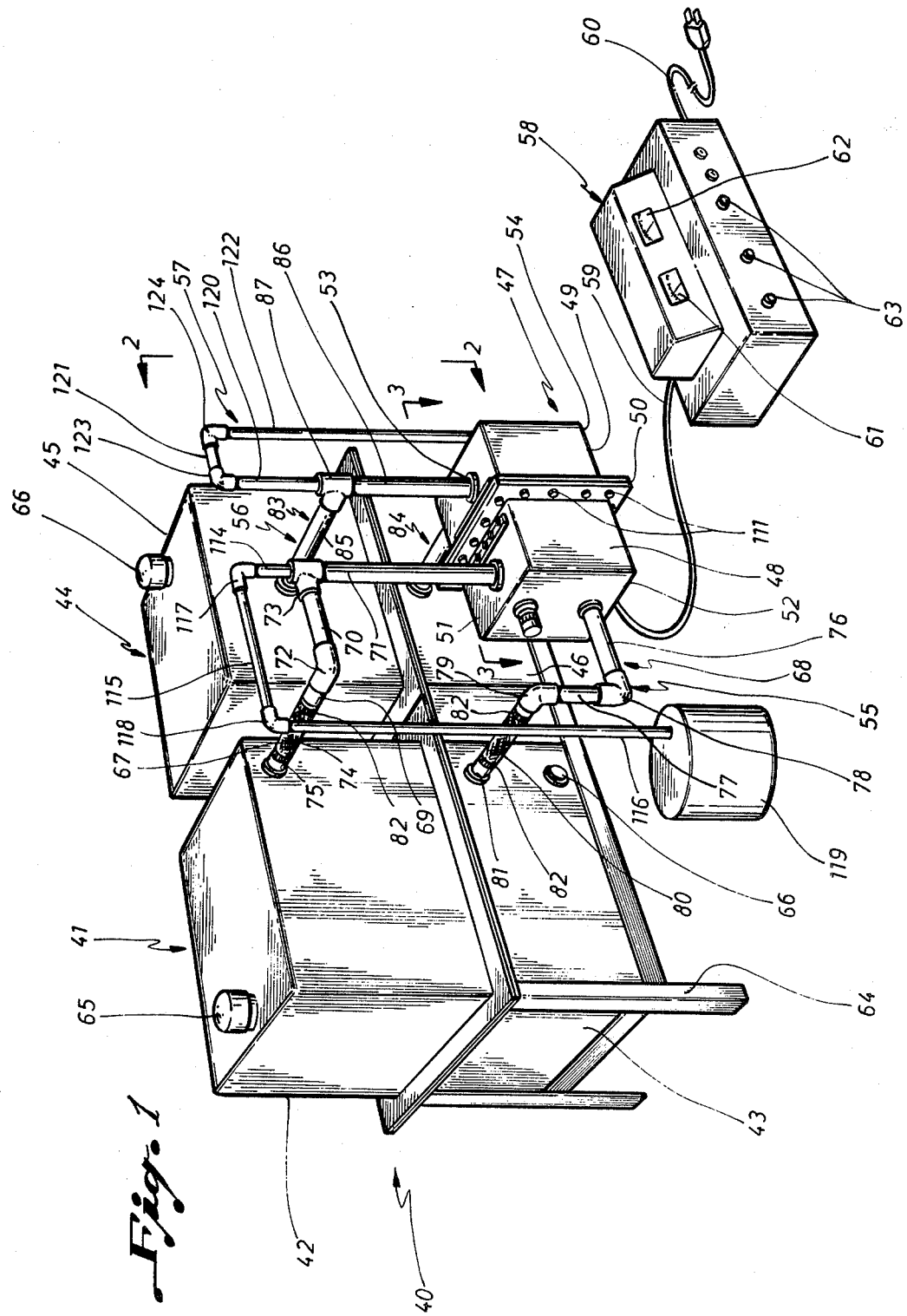
FIG. 1 is an isometric, perspective view of the chlorine generator in accordance with the present invention.

In FIG. 1, a chlorine generator 40 of the present invention is shown to generally comprise: a first chamber 41 having upper and lower ends 42 and 43 and adapted to be filled with water; a second chamber 44 having upper and lower ends 45 and 46 adapted to be filled with water and sodium chloride (not shown); a housing 47, including first and second compartments 48 and 49 releasably secured thereto and separated in part by a fluorinated polymeric ion-permeable membrane 50, the first compartment having upper and lower ends 51 and 52 and containing a cathode as to be hereinafter described, and the second compartment having upper and lower ends 53 and 54 and containing an anode to be hereinafter described; a first fluid communication means 55 disposed between the first chamber 41 and the first compartment 48 for supplying cooling water to the cathode in the first compartment 48; a second fluid communication means 56 disposed between the second chamber 44 and the second compartment 49 for supplying cooling water and sodium chloride to the anode in the second compartment 49; and means for removing 57 chlorine gas from the second compartment 49, whereby upon electrical power being supplied to the anode and cathode (not shown), chlorine gas is generated in the second compartment 49. A conventional power source 58 is provided to provide direct current to the anode and cathode, as to be hereinafter described, and the power source 58 includes suitable wiring 59 for connection of the power source 58 to the anode and cathode, and wiring 60 for connection to a source of electric current, such as a household electrical outlet (not shown). Power source 58 may include a voltmeter 61 and ampmeter 62, and suitable control switches 63 to adjust the amount of electrical power being provided to the anode and cathode as is conventional in the art.

First and second chambers 41 and 44 may preferably be rectangular in shape and manufactured of a suitable plastic material, such as fiberglass; however, it should be readily understood by one skilled in the art that any suitable material having the required strength and durability requirements could be utilized for chambers 41 and 44. Chambers 41 and 44 may be preferably supported by any suitable frame structure such as that shown at 64. If desired, power source 58 may be disposed on a shelf beneath first or second chambers 41 and 44, or may be disposed on a suitable shelf disposed between chambers 41 and 44 on frame structure 64. Alternatively, power source 58 and its related controls may be supported on the top of first or second chambers 41 and 44, and a suitable cover (not shown) may be provided to protect power source 58 from the elements. Preferably, first chamber 41 has a removeable cap 65 which allows first chamber 41 to be completely filled with water as by a garden hose. First chamber 41 is preferably totally hollow. Alternatively, first chamber 41 may be also provided with suitable, conventional valves and water level sensors to insure that first chamber 41 is always completely filled with water. Accordingly, such a valve would open upon receiving a signal from a water level sensor that the fluid level has dropped below a predetermined limit. The first chamber 41 may also be provided with a drain plug 66 to allow first chamber 41 to be completely drained if necessary.

Second chamber 44 is also provided with a cap 66 to allow second chamber 44 to be filled with water and supplied with an amount of sodium chloride crystals. The sodium chloride crystals may be merely poured through the opening closed by cap 66 in second chamber 44, and the water may also be supplied from any suitable source, such as a garden hose (not shown). Second chamber 44 is preferably hollow with the exception of a means for filtering which will be hereinafter described in connection with FIG. 2. Second chamber 44 may also be provided with a drain plug (not shown) such as drain plug 66.

Figure 2:
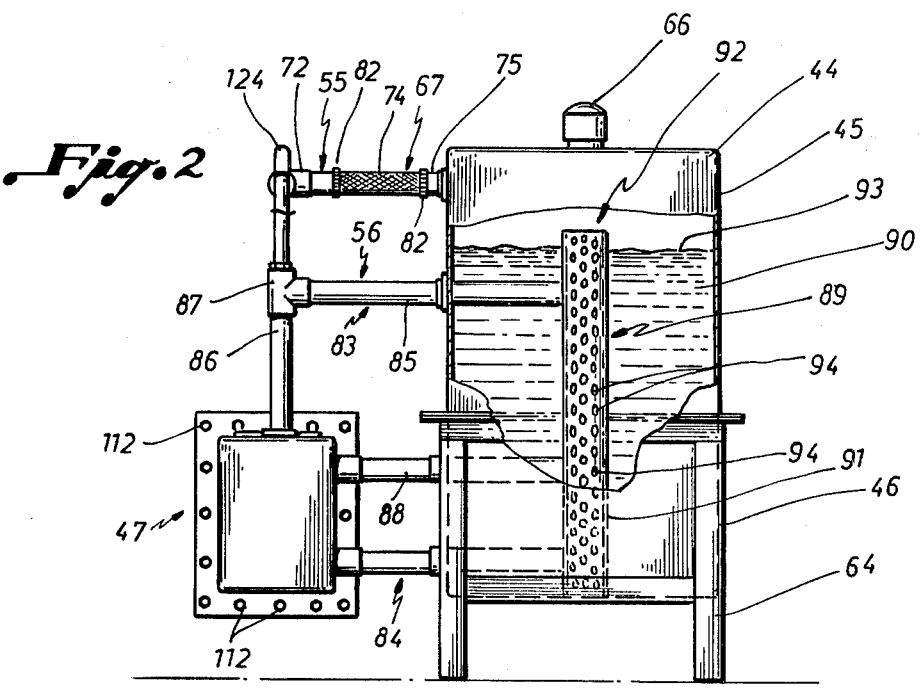
FIG. 2 is a partial cross-sectional view taken along line 2—2 of FIG. 1.

With reference now to FIGS. 1 and 2, the first and second fluid communication means 55 and 56 will be described in greater detail. The first fluid communication means 55 comprises at least two pipes 67 and 68. The first pipe 67 extends from the upper end 42 of the first chamber 41 to the upper end 51 of the first compartment 48. Preferably, first pipe 67 is comprised of a plurality of pipe sections 69-71 including an elbow 72 and tee-fitting 73. Preferably, a section of flexible pipe 74 is disposed between pipe section 69 and fitting 75 disposed on first chamber 41, the purpose of flexible pipe 74 to be hereinafter described. Second pipe 68 of the first fluid communication means 55 extends from the lower end 43 of the first chamber 41 to the lower end 52 of the first compartment 48. Preferably, second pipe 68 is comprised of a plurality of pipe sections 76, 77 and elbows 78 and 79. Additionally, a flexible piece of pipe 80 is disposed between elbow 79 and fitting 81 on first chamber 41, the purpose of which will be hereinafter described. Preferably, both flexible pipe sections 74 and 80 are releasably secured to pipe section 69 and tee 79 as by screw-driven pipe couplings 82.

Figure 3:
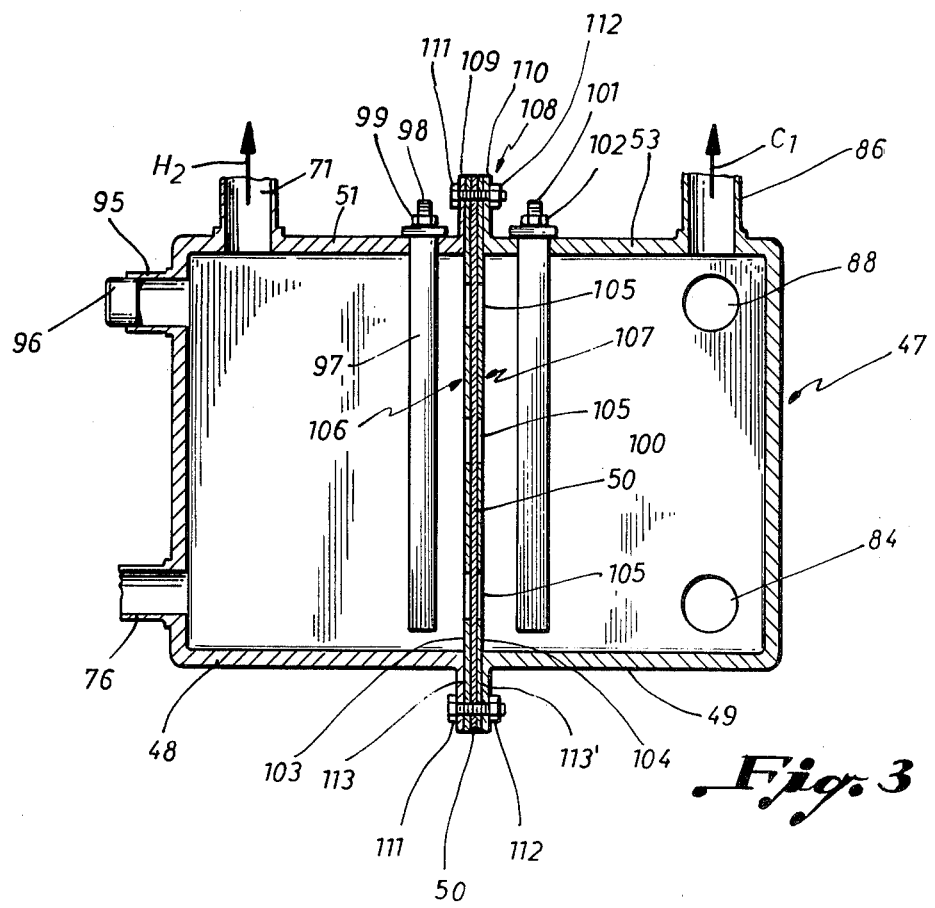
FIG. 3 is a partial cross-sectional view taken along line 3—3 of FIG. 1.

Still with reference to FIGS. 1 and 3, the second fluid communication means 56 will be described in greater detail. Second fluid communication means 56 comprises at least two pipes 83 and 84. The first pipe 83 extends from the upper end 45 of the second chamber 44 to the upper end 53 of the second compartment 49. The second pipe 84 extends from the lower end 46 of the second chamber 44 to the lower end 54 of the second compartment 49. As seen in FIGS. 1 and 2, the first pipe 83 is comprised of pipe sections 85 and 86 and a tee-fitting 87. Second pipe 84 passes directly from second compartment 49 to the second chamber 44 as seen in FIG. 3. Preferably, as a safety feature, the second pipe 84 of second fluid communication means 56 comprises an additional section of pipe 88, as seen in FIG. 2, which is disposed between the upper end 53 of second compartment 49 and the lower end 46 of second chamber 44, the purpose of which will be hereinafter described.

The first and second fluid communication means 55 and 56 operate as follows. Upon direct current being supplied from power source 58 via wiring 59 to the cathode and anode in first and second compartments 48 and 49 of housing 47, heat is generated within the first and second compartments 48 and 49. Accordingly, the water contained in compartment 48 and the sodium chloride-water solution in compartment 49 are thus heated. As the water in first compartment 48 is heated, the hot water rises upwardly through pipe section 71, tee-fitting 73, pipe sections 69, 70 and 74 and elbow 72 into the upper end 42 of first chamber 41. Cooler water found in the lower end 43 of first chamber 41 thus flows through pipe sections 80, 78, and 76 and elbows 78 and 79 back into the lower end 52 of first compartment 48. Likewise, upon the sodium chloride-water solution in the second compartment 49 being heated by the anode, the heated solution rises through pipe 86, tee-fitting 87 and pipe 85 into the upper end 45 of second chamber 44, and cooler water from the lower end 46 of second chamber 44 circulates through pipes 84 and 88 into second compartment 49 of housing 47, thereby cooling the anode.

With reference now to FIG. 2, it is seen that the second chamber 44 contains a means for filtering 89 the water in second chamber 44 from the sodium chloride crystals 90 contained in second chamber 44 so as to prevent the sodium chloride crystals 90 from entering the second compartment 49 through pipes 84 and 88. Preferably, the means for filtering 89 comprises a substantially upright perforated tube 91 disposed in second chamber 44 in a fluid communicating relationship with the at least two pipes 83 and 84 of second fluid communication means 56. Perforated pipe 91 is secured to the bottom of second chamber 44 in the center thereof in any suitable fashion, such as by epoxy. As seen in FIG. 2, pipes 83, 84 and 88, preferably pass through the outer wall of second chamber 44 and continue inwardly within second chamber 44 and pass through perforated pipe 91 to the interior thereof. Perforated pipe 91 is open at its top 92. In operation, cap 66 is removed from second chamber 44 and sodium chloride crystals are poured into second chamber 44 to a level below the top of upright tube 91 as shown at 93 in FIG. 2. Water is then poured into the second chamber 44 so as to completely fill the interior of second chamber 44. This water is free to pass into the interior of the upright perforated pipe 91 not only from the top 92 of pipe 91, but the water also flows through the sodium chloride crystals 90 and into the interior of upright pipe 91 through perforations 94. Thus, as the sodium chloride crystals 90 are dissolved into solution with the water, the water-sodium chloride solution may flow into the second compartment 49 of housing 47 via pipes 84 and 88. The perforations 94 are sized so as to substantially prevent undissolved sodium chloride crystals from entering the second compartment 49.

With reference now to FIG. 3, the housing 47 and first and second compartments 48 and 49 will be described in greater detail. The various pipe connections 71, 76, 84, 88 and 86, as previously described in connection with FIGS. 1 and 2 are shown in FIG. 3. Additionally, it is seen that first compartment 48 may be provided with an auxiliary fitting and drain plug 95 and 96. It is seen that the first compartment 48 of housing 47 is provided with a cathode 97 suspended from the top 51 of first compartment 48. Preferably, cathode 97 may be made of any electrically conducting material, such as, for example, stainless steel, which may be a sheet thereof, or a plurality of rods thereof. Preferably, cathode 97 is of generally rectangular shape having a plurality of upstanding bolts 98 which are secured by a plurality of nuts 99 so that cathode 97 depends downwardly from the upper end 51 of first compartment 48. Cathode 97 is connected to the positive pole of the power source 58 as by wiring 59 (as shown in FIG. 1). Still with reference to FIG. 3, it is seen that the second compartment 49 is provided with an anode 100 which is connected to the negative pole of power supply 58 as by wiring 59 as shown in FIG. 1. Anode 100 may, for example, be a commercially available carbon rod, or any other suitable material. Preferably, anode 100 comprises a plurality of generally rectangular shaped bars, each bar being supported by a bolt 101 and nut 102 disposed on the top 53 of second compartment 49. Still with reference to FIG. 3, it is seen that the ion-permeable membrane 50 separates in part housing 47 into first and second compartments 48 and 49. Preferably, ion-permeable membrane 50 is disposed in a sandwich-like manner between a partition member 103 and a back-up member 104, both of which have a plurality of openings 105 which leave exposed the ion-permeable membrane 50. The ion-permeable membrane 50 may preferably comprise a fluorinated polymer such as, for example, a perfluorosulfonic acid polymer manufactured by E. I. DuPont and sold under the trademark NAFION ™, which has the characteristics of permitting the transfer of Na+ ions across the membrane 50 from the anode compartment, or second compartment 49 to the cathode compartment, or first compartment 48. As will be readily apparent to those skilled in the art, after the first compartment 48 is filled with water and the second compartment 49 is filled with the water-sodium chloride solution, and upon electrical power being supplied to cathode 97 and anode 100, chlorine gas will be formed in the second compartment 49 and hydrogen gas will be formed in the first compartment 48, which gases will rise to the top of each compartment 48 and 49 and bubble outwardly through pipes 86 and 71 respectively, as will be hereinafter described in further detail.

Still with reference to FIG. 3, it is seen that each compartment 48 and 49 has at least one opening 106 and 107 therein, and each compartment 48 and 49 has a means for releasably connecting 108 the compartments to one another with each of said at least one openings 106 and 107 in a substantially mating relationship with each other and with the ion-permeable membrane 50 separating in part the two compartments 48 and 49. Preferably, the means for releasably connecting 108 comprises flange portions 109 and 110 about the periphery of each compartment 48 and 49. A plurality of bolts 111 pass through the flange portions 109 and 110 and are secured by nuts 112. Preferably, bolts 111 and nuts 112 are formed of nylon so as to avoid any corrosion problems therewith. Preferably, the at least one openings 106 and 107 are completely open sides of each of the compartments 48 and 49; however, additional internal flanges could be disposed within the interior of compartments 48 and 49, or alternatively, a plurality of mating openings could be formed in the adjacent sides of compartments 48 and 49, which mating openings also mate with the exposed portions of the ion-permeable membrane 50. Preferably, a mating set of thin gaskets 113 and 113' are disposed about either side of the ion-permeable membrane 50. The outer configuration of gaskets 113, 113' conforms to the flange portions 109 and 110 of compartments 48 and 49, and their internal configuration conforms to the outer periphery of openings 106 and 107. Additionally, a coating of liquid or viscous silicone rubber may be utilized in connection with the gaskets 113, 113' to insure a good seal between the two compartments 48 and 49. Thus, were a leak to develop in the gasket 113' facing second compartment 49, the water and sodium chloride solution contained therein would seep downwardly and outwardly between ion-permeable membrane 50 and flange portion 110 until the water-sodium chloride solution falls downwardly from the leak and harmlessly upon the ground beneath the second compartment 49.

With reference to FIGS. 1 and 3, it is seen that as the hydrogen gas bubbles upwardly through pipe 71 from first compartment 48, it will continue to bubble upwardly and through tee-fitting 73 into pipe sections 114, 115, 116, and elbow 117 and 118. The circulating fluid from first compartment 48 will not pass outwardly through those pipe sections 114–116, insofar as the water level in first chamber 41 is disposed lower than elbow 117 and pipe section 115. The hydrogen gas may be merely vented to the atmosphere, or as shown in FIG. 1, may be collected in a suitable trap, or container, 119.

Likewise, the chlorine gas generated in second compartment 49 bubbles upwardly through pipe 86 and through tee-fitting 87 into pipe sections 120, 121, 122 and elbows 123 and 124. Likewise, the recirculating fluid from first compartment 49 will not pass through elbow 123 insofar as it is disposed slightly higher than the level of water and sodium chloride in second chamber 44. The means for removing 57 chlorine gas from the second compartment 49, being comprised of pipe sections 120–122 and elbows 123 and 124, may then be connected to the suction side of a conventional pump, such as is utilized in connection with a swimming pool, whereby the chlorine gas which has been generated is drawn into the water for the swimming pool and is intermixed therewith to chlorinate the swimming pool.

With reference to FIG. 1, it should be readily apparent to one of ordinary skill in the art that the types of pipe fittings and cross-sectional configuration of the pipe sections shown could be readily varied, and that flexible piping could be used throughout the chlorine generator 40. If flexible piping were used throughout, it would be necessary to rigidly support housing 47, such as by a frame (not shown) whereby the relative positions of the component parts of the chlorine generator 40 could be maintained as is shown in FIG. 1. Preferably, housing 47 is disposed in the relationship shown in FIG. 1 as by the rigid coupling provided by pipe sections 84, 85, and 88. And, the first fluid communication means 55 utilizes the flexible pipe connections provided at 74 and 80 to allow for easy accessiblity and repairability of the housing 47. In this regard, it should be noted that in order to disassemble housing 47 to allow, for example, the replacement of a new ion-permeable membrane 50, all that is necessary is to unscrew the screw pipe fittings 82, which hold flexible pipe sections 74 and 80 in place. Thus, the first fluid communication means 55 is disassociated from the first chamber 41. Then by merely unbolting the plurality of bolts 111 and nuts 112, the entire housing 47 may be readily disassembled with its component part easily accessible. After any necessary repairs or replacement of parts are made within housing 47, the first compartment 48 is resecured to the second compartment 49 with the ion-permeable membrane 50 disposed therebetween as previously described. Flexible pipe connections 74 and 78 allow easy realignment and reconnection of the first fluid communication means 55 to the first chamber 41.

With reference to FIGS. 1-3, the operation of the chlorine generator 40 of the present invention and the method of generating chlorine gas of the present invention will be described. After the cathode 97 is mounted within the first compartment 48 and the anode 100 is mounted in the second compartment 49, the first and second compartments 48 and 49 are releasably secured together via bolts 111 and nuts 112 with ion-permeable membrane 50 disposed between the first and second compartments 48 and 49. First chamber 41 is then disposed in a fluid transmitting relationship with the first compartment 48 as by the first and second pipes 67 and 68 previously described. The second chamber 44 is then disposed in a fluid transmitting relationship with the second compartment 49 as by first and second pipes 83 and 84 as previously described. After first chamber 41 is filled with water and second chamber 44 is filled with water and sodium chloride as previously described in connection with FIG. 2, electrical power is supplied to the anode and cathode 100 and 97, whereby chlorine gas is generated in the second compartment 49 and the water contained in second compartment 49 is heated therein. As previously described in connection with FIG. 2, the heated water from the second compartment 49 is continuously circulated from the upper end 53 of the second compartment 49 to the upper end 45 of the second chamber 44 as by the first pipe 83. Water and sodium chloride from the lower end 46 of the second chamber 44 is then circulated into the lower end 54 of the second compartment 49 as by pipe 84 as previously described. The chlorine gas generated in the second compartment 49 is then removed therefrom as by pipe sections 120-122 and elbow connections 123 and 124 as previously described.

Likewise, the hydrogen gas generated in the first compartment 48 is removed therefrom via pipe sections 114-116 and elbow fittings 117 and 118. Simultaneously and continuously therewith, the water contained in the first compartment 48 is circulated from the upper end 51 of first compartment 48 via the first pipe 67 to the upper end 42 of first chamber 41. Cooler water from the lower end 43 of first chamber 41 is then circulated into the lower end 52 of first compartment 48 as by pipe 68 as previously described. It should be noted that any sodium hydroxide which may be formed in the water circulating from the first compartment 48 into the first chamber 41 will settle downwardly to collect at the bottom or lower end 43 of first chamber 41, and such sodium hydroxide may be later drained from first chamber 41 by opening drain plug 66.

With reference to FIG. 2, it should be noted that the second pipe 88 provides a safety feature in that if the water level in second chamber 44 drops below the level of first pipe 83, there will still be water and sodium chloride in solution therewith flowing into the second compartment 47 via a circulating path formed by pipe sections 84, 88, and upright pipe 91.

It is to be understood that the invention is not limited to the exact details of construction, operation, exact materials or embodiment shown and described, as obvious modifications and equivalents will be apparent to one skilled in the art; for example, a section of water permeable mesh material of any suitable cross-sectional configuration could be substituted for the drain pipe-filter means disposed in the second chamber. Accordingly, the invention is therefore to be limited only by the scope of the appended claims.

We claim:

1. A method of generating chlorine gas comprising the steps of:
   mounting a cathode in a first compartment having upper and lower ends;
   mounting an anode in a second compartment having upper and lower ends;
   releasably securing the first and second compartments together and disposing a fluorinated polymeric ion-permeable membrane between the first and second compartments;
   disposing a first chamber having upper and lower ends and containing water in a fluid transmitting relationship with the first compartment;
   disposing a second chamber having upper and lower ends and containing water and sodium chloride in a fluid transmitting relationship with the second compartment;
   disposing the first and second chambers in a fluid non-transmitting relationship with respect to each other;
   supplying electrical power to the anode and cathode to generate chlorine gas in the second compartment and to heat the water and sodium chloride in the second compartment;
   circulating the heated water in the second compartment from the upper end of the second compartment to the upper end of the second chamber;
   circulating water and sodium chloride from the lower end of the second chamber into the lower end of the second compartment; and
   remove the chlorine gas from the second compartment.

2. The method of generating chlorine gas of claim 1, further comprising the steps of:
   generating and removing hydrogen gas from the first compartment;

circulating the water in the first compartment from the upper end of the first compartment to the upper end of the first chamber; and circulating water from the lower end of the first chamber into the lower end of the first compartment.

3. The method of generating chlorine gas of claim 1, further comprising the step of: filtering the water and sodium chloride in the second chamber to substantially prevent sodium chloride crystals from entering the second compartment.

4. The method of generating chlorine gas of claim 3, further comprising the step of utilizing a substantially upright perforated tube in the second chamber and placing sodium chloride around the perforated upright tube.

5. The method of generating chlorine gas of claim 1 wherein, the first and second compartments are releasably secured by: providing each compartment with at least one opening therein; providing each compartment with a flange portion; disposing each of the at least one openings in a mating relationship; disposing the ion-permeable membrane between the at least one openings of the first and second compartments; and bolting the flange portions together.

6. A chlorine generator comprising:
a first chamber having upper and lower ends and containing water;
a second chamber having upper and lower ends and containing water and sodium chloride;
the first and second chambers being disposed in a fluid non-transmitting relationship with respect to each other;
a housing, including first and second compartments releaseably secured thereto and separated in part by a fluorinated polymeric ion-permeable membrane, the first compartment having upper and lower ends and containing a cathode, and the second compartment having upper and lower ends and containing an anode;
a first fluid communication means disposed between the first chamber and the first compartment supplying cooling water to the cathode in the first compartment, said first fluid communication means comprises at least two pipes, the first pipe extending from the upper end of the first chamber to the upper end of the first compartment and the second pipe extends from the lower end of the first chamber to the lower end of the first compartment;
a second fluid communication means disposed between the second chamber and the second compartment supplying cooling water and sodium chloride to the anode in the second compartment; and means removing chlorine gas from the second compartment;
whereby upon electrical power being supplied to the anode and cathode, chlorine gas is generated in the second compartment and cooling water is continuously circulated through the first compartment, the first chamber, and the first fluid communication means.

7. The chlorine generator of claim 6 wherein, the second fluid communication means comprises at least two pipes, the first pipe extending from the upper end of the second chamber to the upper end of the second compartment and the second pipe extends from the lower end of the second chamber to the lower end of the second compartment.

8. The chlorine generator of claim 7 wherein the at least two pipes are flexibly mounted with respect to the second chamber and the second compartment.

9. The chlorine generator of claim 7 wherein the means removing chlorine gas from the second compartment comprises a tube associated with the first pipe, whereby the chlorine gas bubbles through the water and sodium chloride in the first pipe and passes outwardly through the tube.

10. The chlorine generator of claim 7 wherein the second chamber contains a means for filtering the water from the sodium chloride to substantially prevent sodium chloride crystals from entering the second compartment.

11. The chlorine generator of claim 10 wherein, the means for filtering comprises a substantially upright perforated tube disposed in the second chamber and the at least two pipes are in a fluid communicating relationship with the perforated tube.

12. The chlorine generator of claim 6, wherein each compartment of the housing is formed with at least one opening therein and each compartment has a means for releasably connecting the compartments to one another with each of said at least one openings in a substantially mating relationship with each other and with the ion-permeable membrane separating in part the two compartments.

13. The chlorine generator of claim 12 wherein, the means for releasably connecting comprises a flange portion on each compartment and a plurality of bolts passing through the flange portions.

14. The chlorine generator of claim 13 wherein the ion-permeable membrane is disposed between the flange portions along the outer periphery of the compartments.

15. The chlorine generator of claim 6 wherein the at least two pipes of the first fluid communication means are flexibly mounted with respect to the first chamber and the first compartment.

* * * * *